US010317884B2

(12) United States Patent
Iijima et al.

(10) Patent No.: US 10,317,884 B2
(45) Date of Patent: Jun. 11, 2019

(54) SERVO CONTROLLER

(71) Applicant: FANUC CORPORATION, Minamitsuru-gun, Yamanashi (JP)

(72) Inventors: Kazunori Iijima, Yamanashi (JP); Shunpei Tanaka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/882,014

(22) Filed: Jan. 29, 2018

(65) Prior Publication Data
US 2018/0224829 A1    Aug. 9, 2018

(30) Foreign Application Priority Data
Feb. 6, 2017    (JP) .................................. 2017-019712

(51) Int. Cl.
G05B 19/416    (2006.01)
G05B 19/404    (2006.01)
G05B 19/39    (2006.01)

(52) U.S. Cl.
CPC ........... G05B 19/416 (2013.01); G05B 19/39 (2013.01); G05B 19/404 (2013.01)

(58) Field of Classification Search
CPC .... G05B 19/416; G05B 19/39; G05B 19/404; G05B 19/414
USPC ................................ 318/685, 486, 561, 560
See application file for complete search history.

(56) References Cited

U.S. PATENT DOCUMENTS

| 2002/0022903 | A1* | 2/2002 | Krah | G05B 13/024 |
| | | | | 700/170 |
| 2007/0038328 | A1 | 2/2007 | Endou et al. | |
| 2014/0371916 | A1* | 12/2014 | Nagaoka | B23Q 15/013 |
| | | | | 700/275 |
| 2016/0033959 | A1* | 2/2016 | Iijima | G05B 11/011 |
| | | | | 318/561 |
| 2016/0282841 | A1* | 9/2016 | Ishii | G05B 19/404 |

FOREIGN PATENT DOCUMENTS

| CN | 102566458 | 7/2012 |
| CN | 103262404 | 8/2013 |
| CN | 106338967 | 1/2017 |
| JP | 8-123553 | 5/1996 |
| JP | 2003-53643 | 2/2003 |
| JP | 2007-52505 | 3/2007 |
| JP | 2012-103827 | 5/2012 |
| JP | 2012-110230 | 6/2012 |

OTHER PUBLICATIONS

Office Action issued Mar. 8, 2019 in corresponding Chinese Application No. 201810101664.5.

* cited by examiner

Primary Examiner — Jorge L Carrasquillo
(74) Attorney, Agent, or Firm — Wenderoth Lind & Ponack, L.L.P.

(57) ABSTRACT

A servo controller includes a speed command creation unit, a torque command creation unit, a speed detection unit, a speed control loop, a speed control gain, a filter, a parameter storage unit, a sinusoidal disturbance input unit, a frequency characteristics calculation unit, and a parameter adjustment unit. The parameter storage unit stores a history of past frequency characteristics obtained by the frequency characteristics calculation unit in correlation with past parameter history.

3 Claims, 4 Drawing Sheets

SERVO CONTROLLER

This application is based on and claims the benefit of priority from Japanese Patent Application No. 2017-019712, filed on 6 Feb. 2017, the content of which is incorporated herein by reference.

BACKGROUND OF THE INVENTION

Field of the Invention

The present invention relates a servo controller used in a machine tool having a feed axis driven by a servo motor.

Related Art

Conventionally, a servo controller having a function of restoring stored parameters to restore a previous control condition is known. Patent Documents 1 and 2 disclose examples of this type of technology.

Patent Document 1 discloses a method for easily setting parameters related to servo control particularly in a numerical controller. When the configuration of Patent Document 1 is applied, users can easily designate parameters for motor control even if the users do not have thorough knowledge of a machine structure. Patent Document 2 discloses a method of storing the result of automatic adjustment executed in the past as a history and restoring parameters from the history. Here, the history is correlated with configuration information (weight, dimensions, material, model, or the like) and an adjustment method (adjustment rules for representative patterns for linear mechanisms, ball screws, and pseudo-rigid bodies) of a machine structure.

Patent Document 1: Japanese Unexamined Patent Application, Publication. No. 2007-52505

Patent Document 2: Japanese Unexamined Patent Application, Publication No, 2012-103827

SUMMARY OF THE INVENTION

However, in a servo controller having an automatic adjustment function, there may be a case in which it is desired to restore an appropriate control condition in the past when the result of automatic adjustment of a gain or a filter is not satisfactory or when the control characteristics are not suitable for a machining object or a machining condition due to a user forgetting to execute automatic adjustment. Particularly, since automatic adjustment can be easily performed by users, there is a need that an original state is restored. In this respect, although the controller disclosed in Patent Document 1 can easily designate and change parameters, it is not easy to restore parameters with which previous characteristics can be realized. Moreover, parameters may be changed by improper operation.

Although such an idea of restore points used in operating systems of PCs may be considered, so-called restore points merely store settings in correlation with certain time points (dates). In a control parameter adjustment device disclosed in Patent Document 2, although the results of automatic adjustment are stored as a history, since prior information on a machine structure is necessary, it is not possible to flexibly cope with control modeling errors such as a variation in a resonance frequency or a variation in a lubrication state. For example, when a mechanical part of a machine tool is altered, a difference may occur between the information on an actual machine structure and the registered information on the machine structure, and the result of adjustment based on the history may not reflect the actual situation.

An object of the present invention is to provide a servo controller capable of appropriately restoring to the state before adjustment or the past state according to a user's request after automatic adjustment or an evaluation of an adjustment result.

(1) A servo controller of the present invention is a servo controller (for example, a servo controller 10 to be described later) used in a machine tool (for example, a machine tool 1 to be described later) having a feed axis (for example, a transmission mechanism 2 to be described later) driven by a servo motor (for example, a servo motor 3 to be described later), including: a speed command creation unit (for example, a speed command creation unit 11 to be described later) that creates a speed command value of the servo motor; a torque command creation unit (for example, a torque command creation unit 12 to be described later) that creates a torque command value of the servo motor; a speed detection unit (for example, a speed detection unit 13 to be described later) that detects speed of the servo motor; a speed control loop (for example, a speed control loop 30 to be described later) formed by the speed command creation unit, the torque command creation unit, and the speed detection unit; a speed control gain (for example, a speed control gain 14 to be described later) which is a control gain of the speed control loop; a filter (for example, a filter 21 to be described later) that attenuates a specific frequency component included in a torque command created by the torque command creation unit; a parameter storage unit (for example, a parameter storage unit 24 to be described later) that stores parameters for designating characteristics of the speed control gain and the filter; a sinusoidal disturbance input unit (for example, a sinusoidal disturbance input unit 15 to be described later) that performs sinusoidal sweeping on the speed control loop; a frequency characteristics calculation unit (for example, a frequency characteristics calculation unit 22 to be described later) for estimating a gain and a phase of an input/output signal of the speed control loop from an output of the speed control loop when a sinusoidal wave is input to the speed control loop; and a parameter adjustment unit (for example, a parameter adjustment unit 23 to be described later) that adjusts the parameters stored in the parameter storage unit on the basis of the frequency characteristic calculated by the frequency characteristics calculation unit, wherein the parameter storage unit stores a history of past frequency characteristics obtained by the frequency characteristics calculation unit in correlation with past parameter history.

(2) In the servo controller according to (1), the parameter adjustment unit may store parameters before executing parameter adjustment in the parameter storage unit and then executes parameter adjustment.

(3) In the servo controller according to (1) or (2), the parameter storage unit may store a history of frequency characteristics obtained as the result of the adjustment by the parameter adjustment unit and designates a frequency characteristic within the history to restore the corresponding parameter.

(4) In the servo controller according to any one of (1) to (3), the parameter storage unit may store the frequency characteristic history as a graph, a gain margin, a phase margin, machining accuracy information, or a combination thereof.

According to the servo controller of the present invention, by restoring parameters correlated with frequency characteristics, it is possible to appropriately restore the state before adjustment or the past state according to a user's request after automatic adjustment or an evaluation of an adjustment result.

DETAILED DESCRIPTION OF THE INVENTION

Hereinafter, a servo controller that controls a servo motor of a machine tool having a feed axis will be described as a preferred embodiment of the present invention with reference to the drawings.

Figure 1:
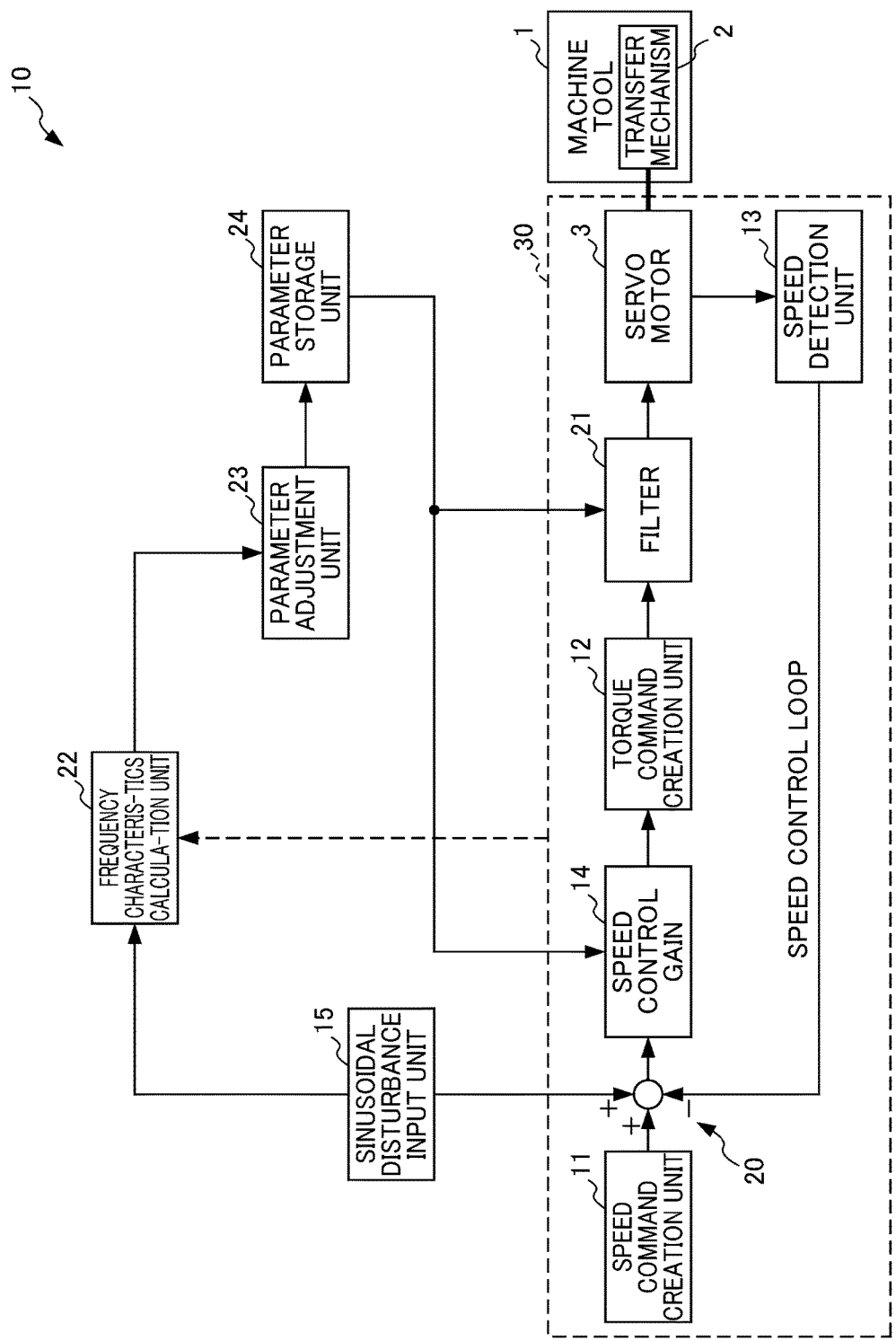
FIG. 1 is a block diagram illustrating a configuration of a servo controller according to an embodiment of the present invention.

FIG. 1 is a block diagram illustrating a configuration of a servo controller 10 according to an embodiment of the present invention. The servo controller 10 of the present embodiment controls a servo motor 3 that operates a driver (not illustrated) of a machine tool 1 via a transmission mechanism (a feed axis) 2. For example, the transmission mechanism 2 is a ball screw and the driver is a table that is operated by the ball screw.

Next, a configuration of the servo controller 10 will be described. As illustrated in FIG. 1, the servo controller 10 includes a speed command creation unit 11, a torque command creation unit 12, a filter 21, a speed detection unit 13, a speed control loop 30, an adder 20, a speed control gain 14, a sinusoidal disturbance input unit 15, a filter 21, a frequency characteristics calculation unit 22, a parameter adjustment unit 23, and a parameter storage unit 24.

The speed command creation unit 11 creates a speed command value for driving the servo motor 3. The speed command value created by the speed command creation unit 11 is output to the adder 20.

The torque command creation unit. 12 creates a torque command value for the servo motor 3. The torque command value created by the torque command creation unit 12 is transmitted to the filter 21.

The filter 21 attenuates a specific frequency component included in the torque command value. The servo motor 3 is driven on the basis of the torque command value in which the specific frequency component is attenuated by the filter 21. The characteristics of the filter 21 of the present embodiment are adjusted by parameters input from the parameter storage unit 24.

The speed detection unit 13 detects speed of the servo motor 3 as a speed detection value. The speed detection value is calculated on the basis of a measurement value measured by an encoder provided in the servo motor 3, for example.

The speed control loop 30 includes the speed command creation unit 11, the torque command creation unit 12, and the speed detection unit 13.

In the adder 20, the speed detection value detected by the speed detection unit 13 is subtracted from the speed command value created by the speed command creation unit 11, and sinusoidal disturbance created by the sinusoidal disturbance input unit 15 that performs sinusoidal sweeping on the speed control loop 30 is added. The frequency of the sinusoidal disturbance input unit 15 is changed sequentially.

The speed control gain 14 sets a control gain to be multiplied with the calculation result obtained by the adder 20. In the present embodiment, the torque command value is created by the torque command creation unit 12 on the basis of the control gain set by the speed control gain 14 and the calculation result obtained by the adder 20. The control gain of the speed control gain 14 of the present embodiment is adjusted by the parameters of the parameter storage unit 24.

Sinusoidal disturbance is input from the sinusoidal disturbance input unit 15 to the frequency characteristics calculation unit 22. The frequency characteristics calculation unit 22 estimates the gain and the phase of an input/output signal of the speed control loop 30 from the output of the speed control loop 30 when the sinusoidal disturbance was input to the speed control loop 30 of the servo controller 10. Furthermore, the frequency characteristics calculation unit 22 expresses the output of the speed control loop 30 using a Fourier series which has an arbitrary number of terms and which uses the frequency of disturbance input from the sinusoidal disturbance input unit 15 as a fundamental frequency and calculates the amplitude and the phase of a fundamental wave component of the Fourier series to thereby calculate the frequency characteristics online. The frequency characteristics calculated by the frequency characteristics calculation unit 22 are transmitted to the parameter adjustment unit 23.

The parameter adjustment unit 23 outputs a signal for adjusting the parameters stored in the parameter storage unit 24 on the basis of the frequency characteristics input from the frequency characteristics calculation unit 22.

The parameter storage unit 24 stores parameters for designating the characteristics of the speed control gain 14 and the filter 21. The parameters stored in the parameter storage unit 24 are characteristic information such as a gain value set to the speed control gain 14 and a frequency, a depth, an inclination, a bandwidth, and the like of the filter 21. The parameters of the parameter storage unit 24 are adjusted on the basis of the frequency characteristics of the frequency characteristics calculation unit 22. In this way, the servo controller 10 of the present embodiment has an automatic adjustment function and performs automatic adjustment at an arbitrary timing or a predetermined timing.

In the parameter storage unit 24, the frequency characteristics calculated by the frequency characteristics calculation unit 22 are stored in correlation with the corresponding parameters and the related information. The related information is a frequency characteristics graph such as a Bode diagram, a gain margin, a phase margin, machining accuracy information, and the like and these pieces of related information are stored in combination. Text information such as a memo indicating that a predetermined accuracy condition is exceeded, for example, can be used as the machining accuracy information.

Next, the restoring function of restoring parameter settings from the history of past frequency characteristics by the servo controller 10 of the present embodiment will be described. The restoring function is a function used when the result of automatic adjustment of the speed control gain 14 or the filter 21 is not satisfactory or when the control characteristics are not suitable for a machining object or a machining condition due to a user forgetting to execute automatic adjustment.

Figure 2:
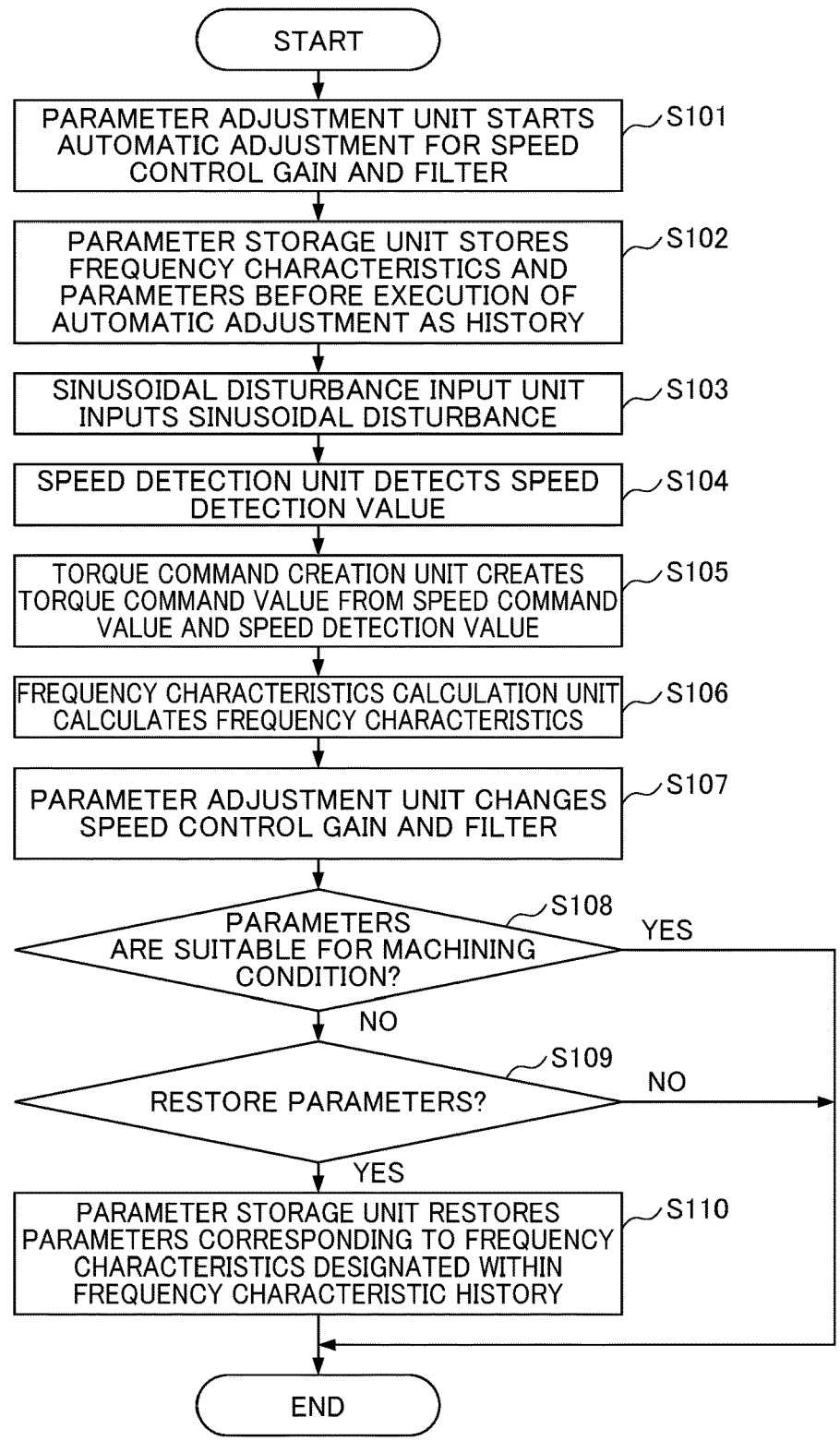
FIG. 2 is a flowchart illustrating a parameter restoring process by the servo controller according to the present embodiment.
Figure 3:
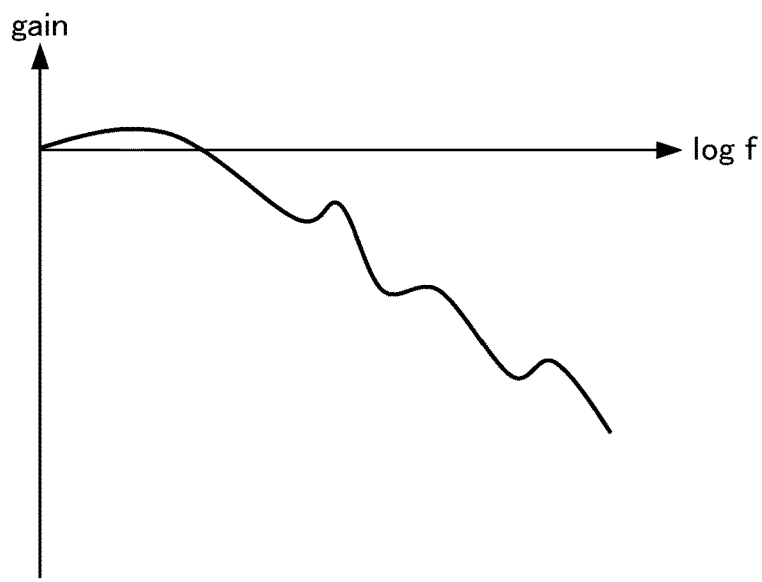
FIG. 3 is an explanatory diagram (Bode diagram) illustrating frequency characteristics before a machining object is changed.

FIG. 2 is a flowchart illustrating a parameter restoring process by the servo controller 10 of the present embodiment. FIG. 3 is an explanatory diagram illustrating frequency characteristics before a machining object is changed.

When a machining object which is a machining object of the machine tool 1 is changed, automatic adjustment for fine adjustment is performed by the servo controller 10. When the parameter adjustment unit 23 starts automatic adjustment for the speed control gain 14 and the filter 21 (step S101), the parameter storage unit 24 stores the frequency characteristics and the parameters before execution of automatic adjustment in the history (step S102). For example, the frequency characteristics illustrated in FIG. 3 and the parameters corresponding to the frequency characteristics are stored in the parameter storage unit 24.

The sinusoidal disturbance input unit 15 inputs sinusoidal disturbance (step S103) and the speed detection unit 13 detects a speed detection value (step S104). The torque command creation unit 12 creates a torque command value from the speed command value and the speed detection value (step S105).

Figure 4:
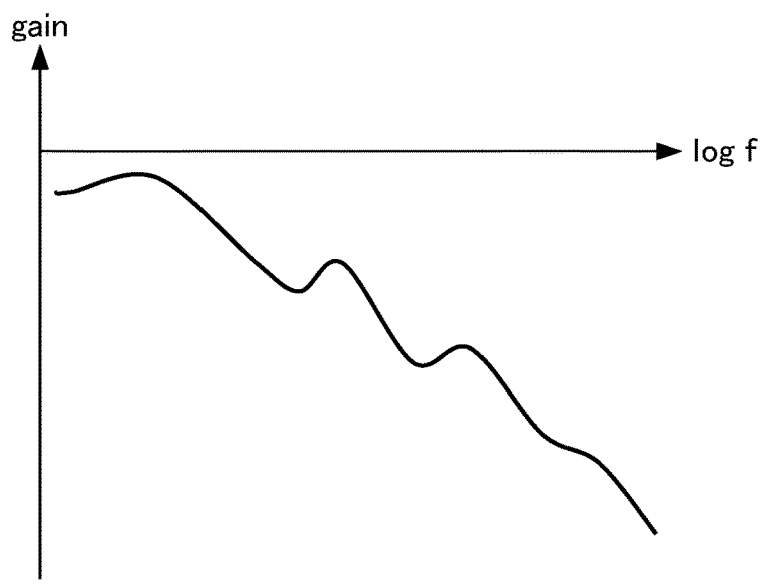
FIG. 4 is an explanatory diagram (Bode diagram) illustrating frequency characteristics after automatic adjustment is performed according to a change in a machining object.

FIG. 4 is an explanatory diagram illustrating frequency characteristics after automatic adjustment is performed according to a change in a machining object. The frequency characteristics calculation unit 22 calculates the frequency characteristics online (step S106), and the parameter adjustment unit 23 adjusts the parameters of the parameter storage unit 24 on the basis of the frequency characteristics calculated by the frequency characteristics calculation unit 22 and changes the characteristics of the speed control gain 14 and the filter 21 (step S107). For example, the frequency characteristics illustrated in FIG. 3 are changed to the frequency characteristics illustrated in FIG. 4.

Subsequently to the process of step S107, it is determined whether the parameters are suitable for a machining condition (step S108). The flow ends when it is determined in step S108 that the parameters are suitable for the machining condition. The flow proceeds to a process (step S109) of determining whether parameters are to be restored when the parameters are not suitable for the machining condition. For example, in the frequency characteristics illustrated in FIG. 4, since the accuracy is not sufficient and is not suitable for the machining condition, the flow proceeds to the process of step S109.

The flow ends when it is determined in step S109 that the parameters are not to be restored. When it is determined in step S109 that the parameters are to be restored, a predetermined frequency characteristic is designated from the frequency characteristics stored in the history and parameters corresponding to the predetermined frequency characteristic are restored by the parameter storage unit 24 (step S110).

Figure 5:
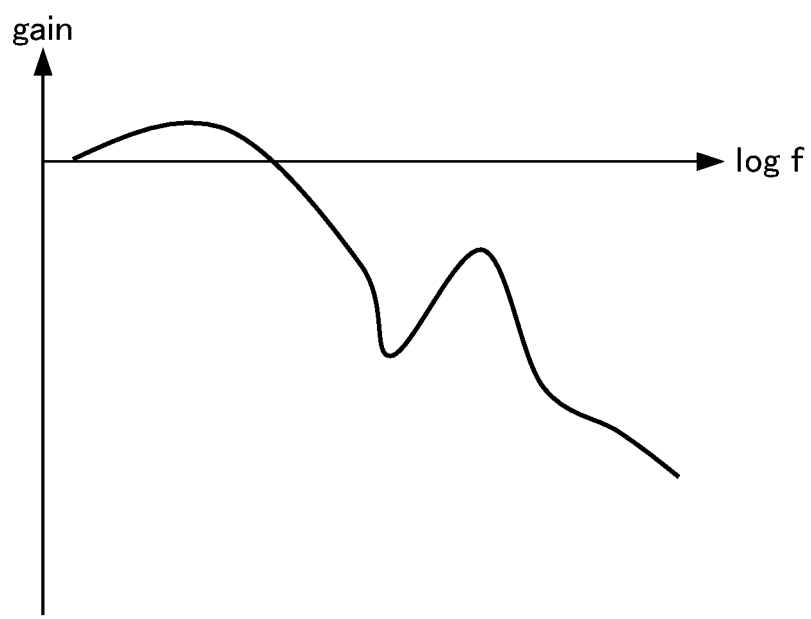
FIG. 5 is an explanatory diagram (Bode diagram) illustrating frequency characteristics after parameters are restored.

FIG. 5 is an explanatory diagram illustrating the frequency characteristics after the parameters are restored. In steps S109 and S110, another frequency characteristic that satisfies the accuracy condition in the past is selected from the history, and the parameters corresponding to the frequency characteristic are restored by the parameter storage unit 24. According to the restored parameters, the characteristics of the speed control gain 14 and the filter 21 are changed. As a result, the frequency characteristics are changed from the state illustrated in FIG. 4 to the state illustrated in FIG. 5, and it is possible to avoid downtime resulting from adjustment time.

In the processes of steps S108 to S110, the restorability of parameters and the designation of the past frequency characteristics may be determined automatically according to a predetermined evaluation criterion and an evaluation of an adjustment result. The parameters may be restored according to the result of a user's selection and designation (a user's request) via an interface (not illustrated) such as a display screen or a manipulation unit.

The present embodiment described above has the following configuration. The servo controller 10 of the present embodiment includes the speed command creation unit 11, the torque command creation unit 12, the speed detection unit 13, the speed control loop 30, the speed control gain 14, the filter 21, the parameter storage unit 24, the sinusoidal disturbance input unit 15, the frequency characteristics calculation unit 22, and the parameter adjustment unit 23. The parameter storage unit 24 stores the history of the past frequency characteristics obtained by the frequency characteristics calculation unit 22 in correlation with the past parameter history.

In this way, since the parameter history is stored in correlation with the past characteristics history, it is possible to restore the parameters correlated with the control characteristics. Since the servo controller has restore points, it is easy to escape from a state in which the axis control characteristics are not suitable, and to reduce the adjustment time and the downtime associated therewith to thereby utilize automatic adjustment. Moreover, since the control characteristics designated among the setting history correlated with the characteristics (control performance) can be reproduced, even when the automatic adjustment result is not suitable for the machining condition or the actual situation of a machining object, it is possible to easily restore the previous control condition. Since automatic adjustment can be easily performed by users, although the automatic adjustment is repeated for a plurality of times without making any memo or the like, it is possible to easily restore the previous state even in this case. Moreover, since prior information on a machine structure is not necessary, it is possible to flexibly cope with control modeling errors such as a variation in a resonance frequency or a variation in a lubrication state. Moreover, there is a case in which the configuration changes greatly due to alteration of a mechanical part or addition of components. For example, a trunnion may be loaded at the back of a three-axis machine tool to form a four-axis or five-axis machine tool. In such a case, the parameters before and after alteration may be compared using the past history. Therefore, it is possible to easily adjust the parameters themselves and to realize a configuration in which a user selects a state to be restored among the states of control performance.

In the present embodiment, the parameter adjustment unit 23 stores parameters before execution of parameter adjustment in the parameter storage unit 24 and then executes parameter adjustment.

In this way, since the past parameters are stored automatically, it is possible to reliably prevent a situation in which parameters are not stored due to a user forgetting to perform manipulation.

In the present embodiment, the parameter storage unit 24 stores the history of frequency characteristics obtained as the result of the adjustment by the parameter adjustment unit 23 and designates a frequency characteristic within the history to restore the corresponding parameter.

In this way, the measured frequency response (for example, a Bode diagram or a Nyquist diagram) itself is stored in correlation with the parameter. Since the parameters correspond to the actual frequency characteristics determined according to a machine structure, a machining object, or the like, the actual state of the machine tool can be applied to the restoring process with high accuracy.

In the present embodiment, the parameter storage unit 24 stores the frequency characteristic history as a graph, a gain margin, a phase margin, machining accuracy information, or a combination thereof.

In this way, since information that users can easily understand or information corresponding to the actual situation is stored as parameters, it is possible to further improve reproducibility during restoring.

While the preferred embodiment of the present invention has been described, the present invention is not limited to the above-described embodiment and may be changed appropriately. For example, the speed control loop 30 is merely illustrated as an example, the configuration itself of the speed control loop 30 is not important, and the part surrounded by a broken line illustrated in FIG. 1 may be grasped as one system having an input/output relation. Moreover, two or more filters 21 may be disposed. When a plurality of filters 21 are provided, since the parameters of the respective filters 21 are stored in correlation with the frequency characteristics according to the present embodiment, it is possible to execute the restoring process immediately.

EXPLANATION OF REFERENCE NUMERALS

1: Machine tool
2: Transmission mechanism (Feed axis)
3: Servo motor
10: Servo controller
11: Speed command creation unit
12: Torque command creation unit
13: Speed detection unit
14: Speed control gain
15: Sinusoidal disturbance input unit
21: Filter
22: Frequency characteristics calculation unit
23: Parameter adjustment unit
24: Parameter storage unit
30: Speed control loop

What is claimed is:

1. A servo controller used in a machine tool having a feed axis driven by a servo motor, comprising:
a speed command creation unit that creates a speed command value of the servo motor;
a torque command creation unit that creates a torque command value of the servo motor;
a speed detection unit that detects speed of the servo motor;
a speed control loop formed by the speed command creation unit, the torque command creation unit, and the speed detection unit;
a speed control gain which is a control gain of the speed control loop;
a filter that attenuates a specific frequency component included in a torque command created by the torque command creation unit;
a parameter storage unit that stores parameters for designating characteristics of the speed control gain and the filter;
a sinusoidal disturbance input unit that performs sinusoidal sweeping on the speed control loop;
a frequency characteristics calculation unit for estimating a gain and a phase of an input/output signal of the speed control loop from an output of the speed control loop when a sinusoidal wave is input to the speed control loop; and
a parameter adjustment unit that adjusts the parameters stored in the parameter storage unit on the basis of the frequency characteristic calculated by the frequency characteristics calculation unit, wherein
the parameter storage unit stores a history of past frequency characteristics obtained by the frequency characteristics calculation unit in correlation with past parameter history, and
the parameter storage unit stores the frequency characteristic history as a graph, a gain margin, a phase margin, machining accuracy information, or a combination thereof.

2. The servo controller according to claim 1, wherein the parameter adjustment unit stores parameters before executing parameter adjustment in the parameter storage unit and then executes parameter adjustment.

3. The servo controller according to claim 1, wherein the parameter storage unit stores a history of frequency characteristics obtained as the result of the adjustment by the parameter adjustment unit and designates a frequency characteristic within the history to restore the corresponding parameter.

* * * * *